W. E. HAWKINS.
Covered Dishes.

No. 217,461. Patented July 15, 1879.

Witnesses:
Chas. E. Griffin
W. J. Cambridge

Inventor,
Westel E. Hawkins
per A. E. Teschemacher
Atty

UNITED STATES PATENT OFFICE.

WESTEL E. HAWKINS, OF BOSTON, ASSIGNOR TO JAMES W. TUFTS, OF MEDFORD, MASSACHUSETTS.

IMPROVEMENT IN COVERED DISHES.

Specification forming part of Letters Patent No. 217,461, dated July 15, 1879; application filed April 25, 1879.

*To all whom it may concern:*

Be it known that I, WESTEL E. HAWKINS, of Boston, in the county of Suffolk and State of Massachusetts, have invented an Improvement in Covered Dishes, of which the following is a full, clear, and exact description, reference being had to the accompanying drawings, making part of this specification, in which—

Figure 1:
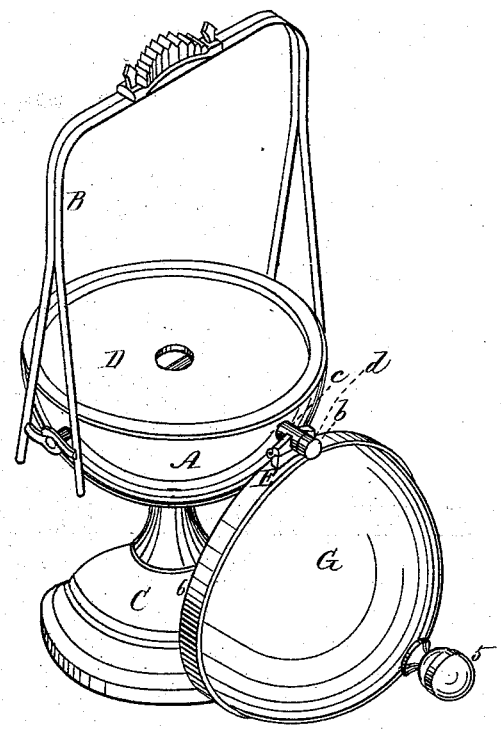
Figure 2:
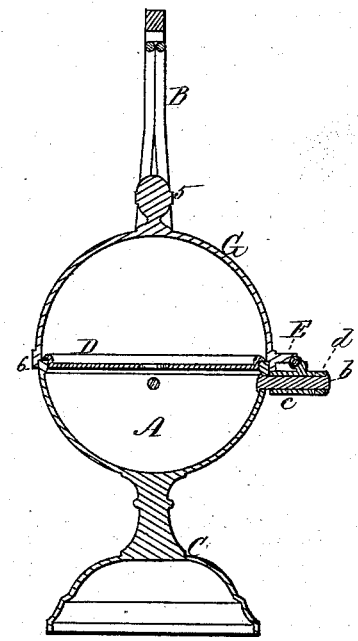
Figure 3:
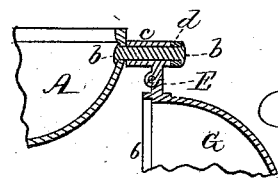

Figure 1 is a perspective view of a covered dish constructed in accordance with my invention, the dish being uncovered. Fig. 2 is a vertical section through the center of the dish, with the cover on; Fig. 3, sectional detail, with the parts in the same position as in Fig. 1.

My invention relates to an improvement in covered dishes for containing butter and other edibles; and consists in connecting the cover with the dish by means of a joint so constructed as to allow the cover to be readily swung up to expose the contents of the dish, and then turned down laterally in a plane at, or nearly at, right angles to that in which it was raised, so as to be suspended on the outside of the dish ready to be raised and replaced upon the top thereof when required.

To enable others skilled in the art to understand and use my invention, I will proceed to describe the manner in which I have carried it out.

In the said drawings, A represents the body of a butter-dish, which is of hemispherical form, and is provided with an ornamental bail or handle, B, and a base or stand, C, the top of the dish having fitted within it the ordinary perforated plate or shallow pan D, on which the butter is placed.

From the exterior of the body A, a little below its upper edge and midway between the points of attachment of the bail B, projects a stud or pin, *b*, which is encircled by a short sleeve, *c*, held in place by a collar or head, *d*, riveted on the end of the pin, the sleeve being free to swivel around on the pin.

To this sleeve *c* is secured one of the leaves of a hinge, E, the other leaf of which is soldered to the hemispherical cover G, which is made in a single piece and adapted to fit snugly over the upper edge of the body A, as seen in Fig. 2.

When it is desired to remove the cover G to gain access to the contents of the dish, it is first swung up on the hinge E by taking hold of the knob or handle 5 until the plane of its edge 6 is at, or nearly at, right angles with the plane of the upper edge of the dish, after which the cover is partially rotated on the swivel *b c*, in a plane at, or nearly at, right angles to that in which it was raised from the dish, down into the position seen in Fig. 1, where it hangs suspended by the swivel-hinge E upon the outside of the dish, with its convex or exterior surface outward, in which position it is always at hand ready to be replaced upon the top of the dish by simply rotating it upward on the swivel, and then swinging it down upon the hinge into the position seen in Fig. 2, the bail B being so placed as not to interfere in any manner with the movements of the cover G.

The dish and its cover may be of oval or other suitable form instead of hemispherical, if preferred.

The above-described covered dish is of simple construction, and not liable to get out of order, while the cover when removed from the top of the dish is entirely out of the way, and, not being disconnected, is always at hand ready to be replaced when desired.

Instead of the body A being supported by a base or stand, C, as shown, it may be supported on legs so arranged as to allow the cover G, after being swung down into the position seen in Fig. 1, to be carried up on its hinge E under the body A, so as to partially inclose it, in which position it would be held by a suitable catch.

What I claim as my invention, and desire to secure by Letters Patent, is—

1. In a covered dish, the combination, with the body A, of a cover, G, adapted to be swung up to, or nearly to, a vertical position, and then rotated downward, so as to be suspended on the outside of the dish, substantially as described.

2. The combination, with the body A, of the cover G, made of a single piece, and connected with the body by a hinged swivel or equivalent device which will allow of its being swung up to, or nearly to, a vertical position, and then rotated downward in a plane at, or nearly at, right angles to that in which it was raised, so as to be suspended on the outside of the dish, substantially as set forth.

Witness my hand this 22d day of April, A. D. 1879.

WESTEL E. HAWKINS.

In presence of—
CHAS. E. GRIFFIN,
W. J. CAMBRIDGE.